United States Patent [19]

Piatek et al.

[11] 4,165,892
[45] Aug. 28, 1979

[54] COUPLING FOR RELEASABLY SECURING ONE END OF A ROD-LIKE MEMBER

[75] Inventors: Edward Piatek, Linden; Timothy Brady, Upper Montclair, both of N.J.

[73] Assignee: Victaulic Company of America, South Plainfield, N.J.

[21] Appl. No.: 824,383

[22] Filed: Aug. 12, 1977

[51] Int. Cl.² ............................................. F16L 17/02
[52] U.S. Cl. .................................. 285/111; 285/382; 285/404; 403/378
[58] Field of Search ............... 285/404, 403, 382, 111, 285/309, 308, 310, 91, 360; 403/374, 409, 378, DIG. 8, 104, 348, 349, 279; 248/411, 413; 220/328

[56] References Cited

U.S. PATENT DOCUMENTS

| 738,008 | 9/1903 | Decker | 403/DIG. 8 X |
|---|---|---|---|
| 1,245,077 | 10/1917 | Webster | 285/404 |
| 1,500,645 | 7/1924 | Schweinert et al. | 285/310 X |
| 1,771,937 | 7/1930 | Pettit | 403/374 X |
| 1,918,519 | 7/1933 | Clements | 403/374 X |
| 2,179,441 | 11/1939 | Webb et al. | 403/378 X |
| 2,716,393 | 8/1955 | Fischer | 403/378 X |
| 2,901,269 | 8/1959 | Richard | 285/308 X |
| 3,841,672 | 10/1974 | Schultz et al. | 285/320 X |
| 3,902,743 | 9/1975 | Martin | 285/308 X |
| 3,951,436 | 4/1976 | Hyde, Jr. | 285/404 X |

FOREIGN PATENT DOCUMENTS

| 452465 | 5/1968 | Switzerland | 285/403 |
|---|---|---|---|
| 19908 | of 1914 | United Kingdom | 285/382 |
| 6146 | of 1916 | United Kingdom | 285/404 |
| 260092 | 10/1926 | United Kingdom | 285/308 |

Primary Examiner—Thomas F. Callaghan
Attorney, Agent, or Firm—Ladas, Parry, Von Gehr, Goldsmith & Deschamps

[57] ABSTRACT

The invention provides a coupling for releasably securing one end of a rod-like member. To this end a body is dimensioned to receive the rod end and support a locking element. The locking element is displaceable with respect to the body to engage the rod end and is associated with rotatable camming means. Partial rotation of the camming means imparts a camming action to force the locking element into locking engagement with the rod end and further rotation of the camming means withdraws the element to unlock the rod end. The locking partial rotation of the camming means is through an arc of substantially 90° and the unlocking further rotation is through a similar arc in the same or the opposite direction.

19 Claims, 15 Drawing Figures

COUPLING FOR RELEASABLY SECURING ONE END OF A ROD-LIKE MEMBER

BACKGROUND OF THE INVENTION

The invention aims at providing a sound and reliable coupling for releasably securing one end of a rod-like member.

In the preferred embodiments later to be described, the rod-like member is a hollow tube or pipe intended for conveying fluids, more particularly liquids. When such pipes are employed, the coupling of the invention can be utilized for joining the ends of adjacent pipe lengths or for joining the end of a pipe length to a junction or union. Two or more such couplings may be utilized at the junction or union to secure the ends of pipes leading thereto. The rod-like member need not necessarily be a pipe and references to "rod-like member" are intended to encompass solid or hollow rods, bars or tubes of circular or any other appropriate cross-section. In such case couplings can be utilized to anchor the terminal end of such a rod-like member or, again, to join appropriate members in end-to-end relationship.

Traditional and conventional methods of joining or coupling the ends of pipes or rod-like members involve screw-threaded arrangements of bayonet-type fasteners. The problems involved in utilizing bayonet-type fasteners in, for example, inserting a junction union into a pipe system will be immediately appreciated since such fasteners necessarily entail relative movement of the members to be joined. Screw-threaded fasteners, whether in the form of an end-to-end join or a lateral screw-threaded clamping pin can suffer from the disadvantages of loosening over time and, more particularly, lack of ease in assembly.

The present invention aims to obviate such disadvantages and provide a very expedient and rapid coupling which can be completely assembled and clamped by a simple one-quarter turn of a locking element.

Applicants have conducted an exhaustive search through the principal and related classes encompassing couplings, connections and joints. That search has revealed a volume of prior art but none of the prior art revealed and considered, either singly or in combination, anticipates or renders obvious the novel invention of this application.

Typical of a lateral screw-threaded coupling is U.S. Pat. No. 3,951,436 to Hyde. That Hyde patent discloses pipe ends disposed one within the other and a lateral screw-threaded clamp extending through the outer pipe end to abut and clamp the inner pipe end on tightening rotation.

Another common traditional way of clamping concentric members one within the other is to drive a wedge or plurality of wedges between the two members. Such a wedging arrangement can be utilized either to join pipe ends or to secure a rod-like member within a bushing. Typical of such a wedge clamping arrangement are U.S. Pat. Nos. 3,806,215 and 3,971,186 to Havelka, et al.

Of all the prior art considered, perhaps the most relevant is U.S. Pat. No. 3,992,118 to Slegers. Slegers utilizes a wedging principle to clamp a curved plate on to the peripheral surface of a tubular member. To drive the wedge into operative clamping arrangement, a collar is rotatable around the tubular member and over the wedge element. That collar has a cam surface which abuts a stationary projection on the tubular member to advance the collar into the wedging position. Although the most relevant of the considered prior art, Slegers is really only relevant insofar as it does utilize a camming principle. There the similarity stops and the necessity of providing an otherwise redundant collar on and around the assembly detracts from the compact nature of the coupling and also ease of coupling.

The foregoing discussed prior art discloses clamping by screw-threaded engagement or by the driving of wedge means between two members to be clamped. These two distinct concepts can be combined and U.S. Pat. No. 3,941,410 to Miyaoka and No. 3,472,533 to Vincent et al. combine these principles to advance a wedge into clamping position by means of screw-threaded tightening of controlling screw means. U.S. Pat. No. 1,611,912 to Hleb is also concerned with a screw propelled wedge movable into and out of an operative clamping position.

In addition to the screw-threaded and wedge controlled couplings, it is generally known to lock two members in the desired position by means of locking pins which, in the simplest concept, drop into registering apertures in members to be joined. Exemplary of such locking pins are U.S. Pat. No. 3,735,928 to Watts, et al., 3,425,632 to Stout and No. 3,243,213 to Proctor. In all these prior patents, the locking pin is merely dropped into position in an accommodating slot.

A fourth and final common mode of coupling a pipe member is the provision of bayonet slots in the pipe member arranged to engage positioning pins. Such bayonet couplings are evidenced in U.S. Pat. No. 2,494,855 to Anderson and No. 3,885,648 to Beziat. It will be appreciated that absent some additional restraining means, a simple bayonet-type coupling will not provide the firm and reliable fluid type joint as is provided by the invention. Moreover, there is no cam controlled locking as is taught by the present invention.

This foregoing recitation and brief analysis of the prior art encountered by the all encompassing search is concerned only with releasable couplings of the general class with which the present invention is concerned. Thus, there has been no discussion of permanent coupling by welding of two members.

SUMMARY OF THE INVENTION

The invention seeks to provide a simple and reliable coupling which can readily be assembled and disassembled by, in all embodiments, simple turning of a locking key through one-quarter of a revolution. In its broadest concept, the invention provides a coupling for releasably securing one end of a rod-like member comprising a body adapted to receive said rod end, a locking element supported by said body and displaceable with respect thereto to engage the rod end, and rotatable camming means associated with said locking element in such manner that partial rotation of said camming means imparts a camming action to force said locking element into locking engagement with said rod end and further rotation of said camming means withdraws said element to unlock said rod end.

In a preferred embodiment of the invention, the body adapted to receive the rod end has at least one recess communicating with the inside of said receiving end, said recess being dimensioned to house the locking element, means for moving said locking element in said recess, the shape of said locking element relative to the shape of said recess being such that said movement imparts a camming action to force said locking element at least partially out of said recess and into locking engagement with said rod end and whereby further movement withdraws said element at least partially into said recess to unlock said rod end. Preferably, the locking partial rotation of the camming means is through an arc of substantially 90° C. and the unlocking further rotation is through a similar arc either in the same direction or in the opposite direction.

The invention will be clearly understood from the following description with reference to the accompanying drawings which are non-limitative and show preferred embodiments of the invention. In the drawings:

DESCRIPTION OF THE PREFERRED EMBODIMENTS

Figure 1:
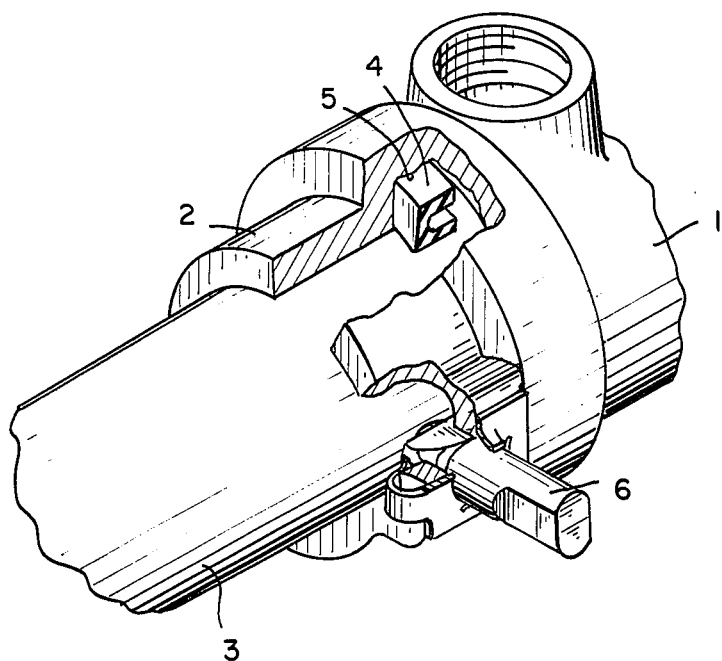
FIG. 1 is a part sectioned perspective view of one embodiment of a coupling of the invention showing the locking component of the coupling in the unlocked position.

The various embodiments illustrated in the drawings show a rod-like member releasably secured in a bushing embodied in a junction member for incorporation in a pipe system.

The perspective view of FIG. 1 shows only one end portion of such a junction member 1 having a bushing portion 2 dimensioned to receive one end of a rod-like member in the form of a pipe 3. A fluid tight seal between the bushing and pipe end is provided by a gasket 4 seated within a channel 5 provided in the junction member 1 to provide a sealed fitting between said junction member and pipe end.

The coupling union is assembled by pushing the pipe end 3 into the bushing 2 beyond the sealing gasket 4. Thereupon the pipe end is clamped in position my means of a locking pin 6 which is movable inwardly under the control of cam means in the manner hereinafter described.

Figure 3:
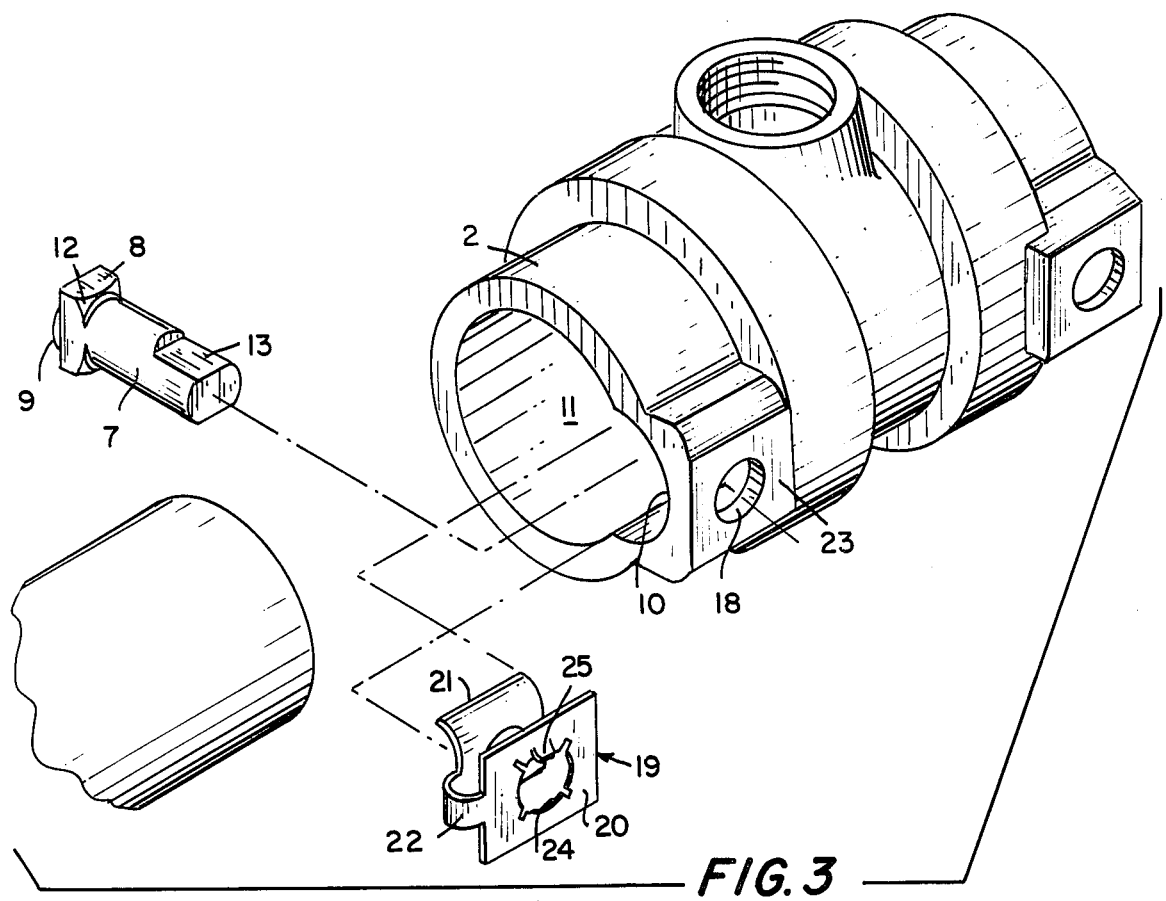
FIG. 3 is an exploded perspective view of the embodiment shown in FIGS. 1 and 2.

As most clearly shown in the exploded view of FIG. 3, the locking pin 6 comprises a stem portion 7, a camming head 8 and a pipe engaging end 9. The locking pin projects radially outwardly through a wall portion of the brushing 2.

Figure 2:
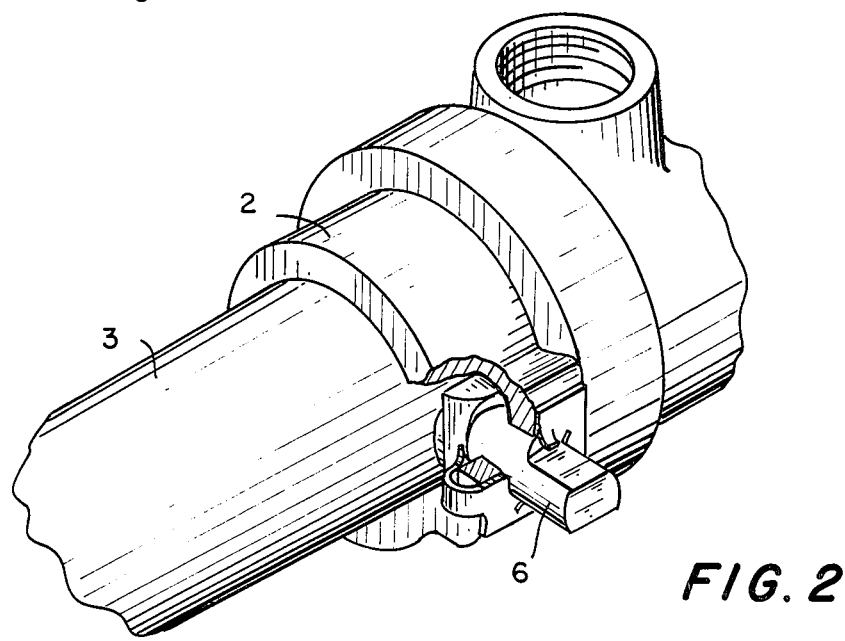
FIG. 2 is a view generally similar to FIG. 1 but showing the locking component in the locked position.

In the embodiment illustrated in FIGS. 1 to 3, the camming head 8 is seated within a recess 10 which opens radially into the bore 11 of the bushing 2. As shown in the drawings, the camming head is rectangular in shape and, when the locking pin is in the unlocked position (FIG. 1) the longer sides of the rectangular head lie parallel to the axis of the recess 10, thereby permitting the camming head to seat within the recess. With the camming head within the recess in this manner, the locking pin occupies the withdrawn or unlocked position and the pipe and junction bushing may be engaged or disengaged.

To lock the pipe end within the bushing, the locking pin is moved radially inwardly to a position in which the pipe engaging end 9 firmly abuts and exerts a clamping action. As will be described hereinafter, the pipe engaging end may be suitably profiled to enhance such clamping action.

Inward movement of the locking pin toward the clamping position is effected by a camming action provided by interaction between the camming head 8 and the recess 10. To this end, the head 8 has camming surfaces 12 which cooperate with the recess 10 upon rotation of the pin 6 about the longitudinal axis of the stem portion 7. To facilitate such rotational movement, flats 13 may be provided on the outermost end of the stem 7 remote from the camming head 8. Such flats may be dimensioned to cooperate with a turning key, a spanner or any appropriate torque imparting member (not shown).

Upon such rotational movement of the locking pin 6, the camming surfaces 12 will initially move into abutting relationship with the walls of the recess 10. Continued rotational movement in the same direction will then cause the camming surfaces 12 to ride up on the internal surface of the recess 10 thereby forcing the locking pin radially inwardly into the pipe clamping position by a camming action.

Figure 11:
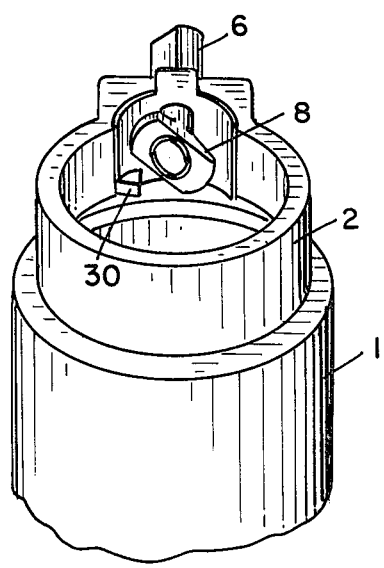
FIG. 11 is a perspective end view of the embodiment of FIGS. 1 to 3.

It will be appreciated that maximum displacement of the locking pin 6 in the direction of the longitudinal axis of the stem portion 7 is brought about by rotation of the pin through one quarter of a turn. In other words, a turning action of 90° will displace the locking pin from the unlocked to the position of maximum locking. Continued turning beyond this point is preferably prevented and to this end a lug stop 30 (FIG. 11) is provided. Withdrawal of the pin to the unlocked position is thus effected by rotation in the opposite direction. Although it is preferred to lock and unlock by turning the pin in opposite directions, the same result can be achieved by omitting the stop to permit continued rotation of the pin beyond 90° and up to 180°. Consequently, with the locking pin in its maximum advanced position (i.e. after one quarter of a turn), withdrawal of the pin can be effected either by further rotation in the same direction or by rotation in the opposite direction.

As most clearly shown in FIGS. 9A through 9D, the pipe engaging end 9 of the pin 6 may be profiled in order better to grip the pipe end 3. Furthermore, if these profiles are of hardened material having sharp edges, then they will tend to bite into the pipe 3 to provide an even better union. Thus, in FIG. 9A two curved knife edges 14, 14' are shown. These knife edges are symmetrically disposed about the axis of rotation of the pin 6 and will thus move in to a bitting engagement with the pipe end upon inward advancement of the pin 6.

Figure 9A:
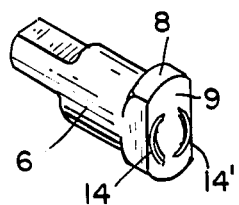
FIGS. 9A through 9D are generally schematic views showing in perspective four alternative configurations of a locking component incorporated in the embodiments of FIGS. 1 to 8.
Figure 9B:
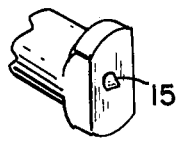

FIG. 9B shows a pointed spike located on the axis of rotation of the pin 6 which serves a similar purpose.

Figure 9C:
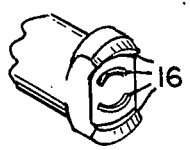

FIG. 9C represents a further modification of the embodiment illustrated in FIG. 9A. In FIG. 9C four knife edges 16 are provided and, again, these are symmetrically disposed about the axis of rotation.

Figure 9D:
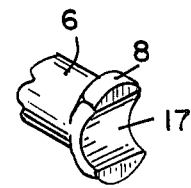

In the embodiment illustrated in FIG. 9D of the drawings, the pipe engaging end of the pin 6 is generally curved to define a channel 17 which, in the unlocked withdrawn position of the pin, straddles the pipe end. Upon rotation of the locking pin 6, with the consequent camming advancement thereof, the axis of the channel 17 will move from an orientation parallel to the axis of the pipe 3 to an orientation at right angles thereto. In this latter orientation, the end walls delimiting the channel 17 will abut and clamp the pipe end. Advantageously, the end portions of the walls are tapered and, upon rotation of the locking pin 6, these tapered end wall portions ride up on the external surface of the pipe end 3 and complement the camming action of the head 8.

As is most clearly seen in the exploded view of FIG. 3 of the drawings, the pin 6 is seated in an aperture 18 in the bushing 2. Outward movement of the pin is prevented by the camming head 8 engaging the walls of the recess 10. In order to restrain inward movement of the pin and prevent said pin from falling out of the aperture 18 when no pipe 3 is seated within the bushing, a retaining clip 19 is provided. This retaining clip is generally U-shaped havin limbs 20, 21 and an interconnecting bridge 22. With the clip in position on the bushing, the bridge 22 straddles an end wall thereof to permit the limb 20 to overlie a flat 23 on the external surface of the bushing 2 and the limb 21 to seat within the recess 10. To this end, the limb 21 is curved. Advantageously, at least the limb 21 is made of a hardened metal in order that it will not be chewed or otherwise deformed by the forces imparted during the camming action of the head 8. The limbs 20 and 21 of the clip 19 are apertured and the respective apertures align with the aperture 18 to receive the locking clip 6. The aperture 24 in the limb 20 is profiled to engage the pin and restrain inward movement thereof.

In addition, a flexible lip 25 upstands from the outer surface of the limb 20 to abut the side of the pin 6 and retain said pin in the desired position of rotation. Although the flexibility of the lip may be such as to provide sufficient retaining force on the rounded clip side, the lip may be dimensioned to cooperate with the flats 13.

Figure 4:
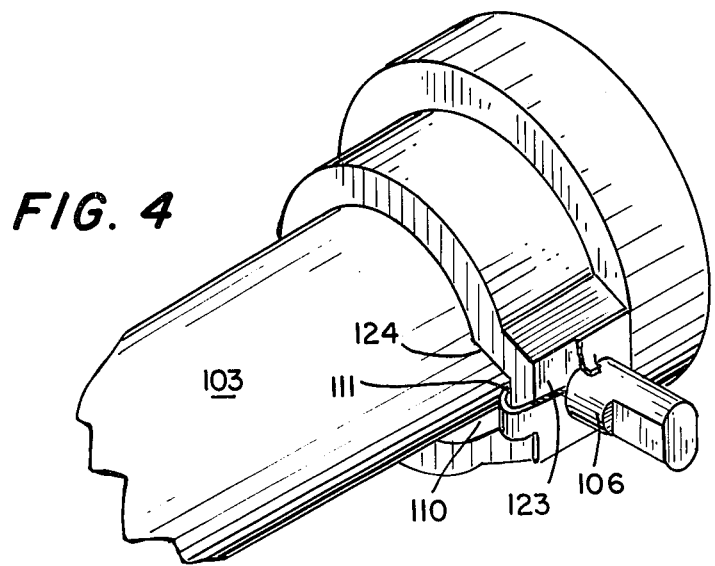
FIG. 4 is a perspective view of a second embodiment of the invention.

FIG. 4 of the drawings shows an alternative embodiment in which the function and operation of the locking pin 106 is essentially the same as that of the embodiment shown in FIGS. 1 to 3. The embodiment of FIG. 4 differs from the first embodiment only in the shape of the section of the recess 110. In the embodiment of FIGS. 1 to 3, that recess is semi-circular in section and is symmetrically disposed about an axis extending parallel to the axis of the pipe 3. In FIG. 4, the recess 110 is polygonal in cross-section, again with the axis of the recess lying substantially parallel to the axis of the pipe 103. As is most clearly shown in the drawing, the recess 110 is three-sided with a roof 111 disposed parallel to the flat 123. Straight sides 124 slope inwardly from the roof 111 and open into the bore of the bushing. Although only three faces, i.e. two sloping sides and a roof, are shown in FIG. 4, it will be appreciated that any suitable polygonal configuration may be adopted to provide the desired camming action with the camming head of the locking pin.

Figure 5:
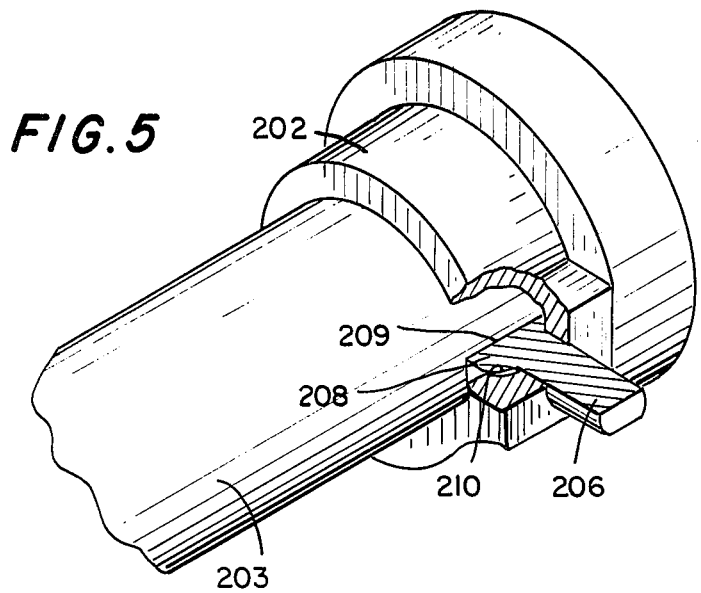
FIG. 5 is a part sectioned perspective view showing a third embodiment of the invention.
Figure 6:
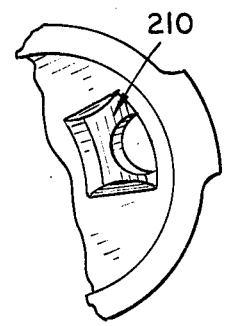
FIG. 6 is a view taken in the direction of arrow A of FIG. 5.

FIGS. 5 and 6 together show yet another configuration of a recess dimensioned to receive the camming head of a locking pin. For purposes of clarity, the pin retaining clip has been omitted from FIG. 5 of the drawings. In the embodiment illustrated in FIGS. 5 and 6, the camming head 208 of the locking pin 206 is seated within a channel 210 having its axis disposed at right angles with respect to the longitudinal axis of the bushing bore. In other words, instead of extending parallel to the bushing bore as in the embodiments of FIGS. 1 to 4, the channel extends part way around the walls defining the bore. Apart from this difference in orientation, the walls of the channel 210 are similarly shaped to cooperate with camming surfaces on the camming head 208 to cause the desired inward movement of the end 209 of the pin 206 to engage a pipe 203 seated within the bushing 202.

Figure 7:
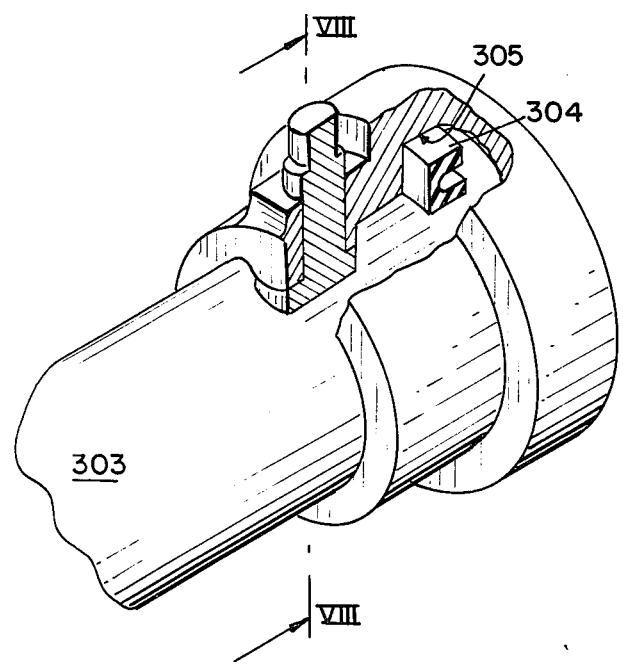
FIG. 7 is a part sectioned perspective view of a fourth embodiment of the invention.
Figure 8:
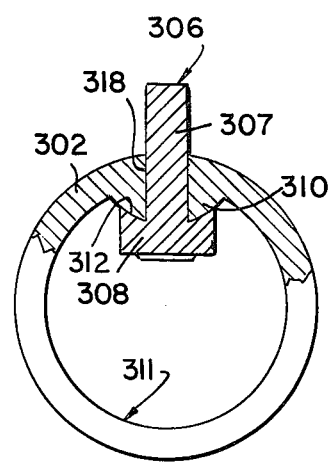
FIG. 8 is a section along the line 8—8 of FIG. 7.

FIGS. 7 and 8 show an embodiment in which, instead of a recess, a projection 310 extends into the bore 311 of the bushing 302. An aperture 318 etends radially outwardly from the bore 311 and through the projection 310.

Although these Figures show a projection instead of a recess, it will, of course, be appreciated that instead of standing proud into the bore 311 the projection 310 could itself be seated within a recess. In this manner, a uniformly closer fit around the pipe periphery would be provided.

The stem 307 of the locking pin 306 is rotatably seated within the aperture 318 and the camming head 308 at the pipe engaging end of the pin has an outwardly directed camming surface 312 cooperating with the profiled surface of the projection 310.

The mode of clamping provided by the embodiment of FIGS. 7 and 8 is essentially the same as that described in the preceding embodiments. The difference in construction is a reversal of the cooperating camming surfaces. In the embodiments of FIGS. 1 through 6, the recess is provided in the bushing with the cooperating projecting surface on the camming head whereas in the embodiment of FIGS. 7 and 8 the camming head is dished to provide the camming surfaces 312 and the projection is provided on the bushing. Although not shown in FIG. 7, or in the even more schematic representation of FIG. 8, the locking pin 306 is restrained, for example by means of a clip, against uncontrolled longitudinal displacement and hence prevented from falling inwardly out of the aperture 318.

As in the preceding embodiments, a gasket 304 is seated within a channel 305 in the bushing housing to ensure a fluid tight seal with the inserted pipe 303.

Figure 10:
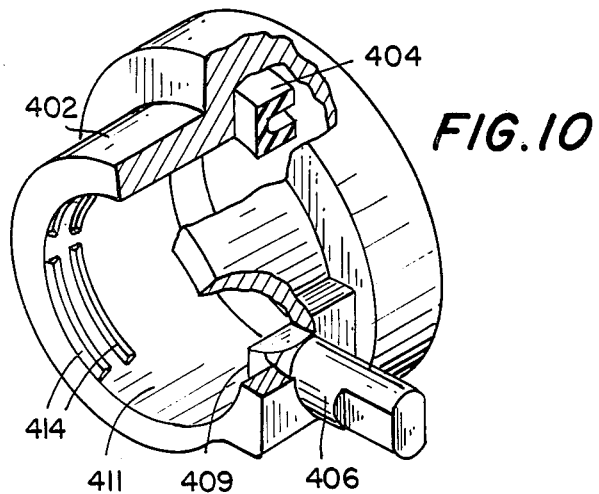
FIG. 10 is a part sectioned perspective view of part of a fifth embodiment of a coupling of the invention.

As described with particular reference to FIGS. 9A through 9D, the clamping action of the locking pin may be enhanced by appropriately profiling the inwardly directed pipe engaging end of the locking pin. FIG. 10 shows an alternative embodiment in which the pipe engaging end 409 of the pin 406 may be plane and serve only to impart an interference force to a pipe end tending generally to urge that pipe end into firm engagement with the portion of the bore 411 located diametrically opposite the pin 406. With such an arrangement, and to enhance the clamping action, knife edge projections 414 stand proud of the diametrically opposed portion of the bore. As shown in FIG. 10, these projections 414 are preferably arranged to subtend an arc extending part way around the bore surface and thereby cooperate with the locking pin 406 to provide firm clamping between the bushing 402 and an inserted pipe end. A gasket 404 is provided to ensure a fluid tight seal.

If desired, the knife edge projections 414 can be provided to complement a profiled end 9 of the pin 6. In this manner, sharp edged projections provided on the pin end 9 and in the bore 411 respectively engage an inserted pipe at substantially diametrically opposed locations.

In all the described embodiments the clamping member is made of an appropriately hardened metal. If any, even minor, deformation is to occur upon the application of the clamping force, such deformation should be in the inner pipe member and not in the locking member. It is with this subject in mind that the various securing projections either on the pipe engaging face of the locking member or on the bore of the bushing are provided to "bit into" the pipe end.

Figure 12:
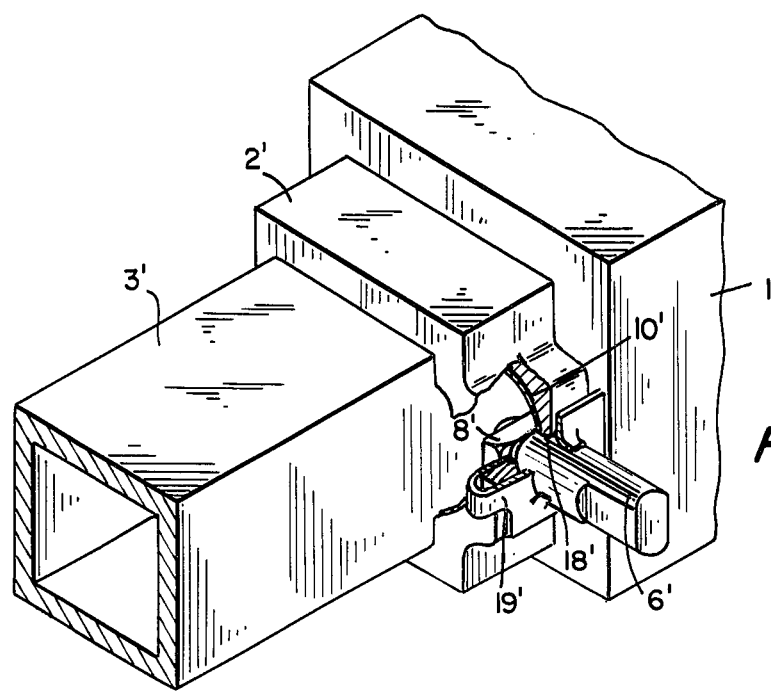
FIG. 12 is a part sectioned perspective view of a modification of the embodiment of FIGS. 1 to 3.

Finally, all embodiments illustrated in FIGS. 1 through 11 are concerned with a circular pipe. However, as has already been explained, the rod-like member can be of any desired cross section and FIG. 12 shows a rod-like member or pipe of rectangular, in fact square, cross section. Apart from a cross section of the rod-like member, the embodiment of FIG. 12 is constructed and operates in the manner of the first embodiment illustrated in FIGS. 1 to 3. Accordingly, detailed description of the embodiment is unnecessary and reference numerals corresponding to those of FIG. 1 with appropriate indices designate components in FIG. 12 corresponding to the components of FIG. 1. Thus, 1' is the junction member with a bushing portion 2' dimensioned to receive one end of a rectangular (square) pipe 3'. A locking pin 6' having a camming head 8' extends through an aperture 18' into a recess 10' opening into the bore of the bushing portion 2'. The locking pin is retained in position by a retaining clip 19' and operates selectively to clamp and release the pipe 3' in the manner described with reference to FIGS. 1 to 3.

It is understood that this invention is not limited in any way by the described and illustrated embodiments, but different modifications may be encompassed within the scope of the claims.

We claim:

1. A coupling for releasably securing one end of a rod-like member comprising a body adapted to receive said rod end, said body having an axial bore therein and a radial opening extending through the wall of the body, a locking pin in said opening and extending radially outwardly from said body and being displaceable in the radial direction to engage the rod end, said locking pin having an enlarged head portion at the radially inner end and a stem portion extending radially outwardly through said body wall, said head portion having a camming surface arranged to abut the inside surface of the body wall in the region of said radial opening and said inside surface of the body wall adjacent said radial opening having a camming surface thereon, said camming surfaces on the body and on said locking pin cooperating in such manner that partial rotation of said pin of about 90° effects relative rotation of said camming surfaces to impart a camming action to force said locking pin radially inwardly into locking engagement with said rod end and further relative rotation of said camming surfaces withdraws said pin to unlock said rod end.

2. A coupling according to claim 1, wherein both the locking partial rotation of the pin and the unlocking further rotation are through similar arcs of about 90°.

3. A coupling according to claim 2, wherein said further rotation of the pin is a continuation of the partial rotation and in the same direction.

4. A coupling according to claim 2, wherein a stop is engaged by the locking pin after partial rotation through the arc of about 90° and wherein said further rotation of the camming means is in the reverse direction from the direction of said partial rotation.

5. A coupling according to claim 1, wherein the pin accommodating radial opening opens into a recess in the wall of the axial bore, and wherein the camming action is provided by cooperating surfaces of the head of the locking pin and the recess.

6. A coupling according to claim 5, wherein said recess is part cylindrical in section and is oriented about an axis lying parallel to the axis of said rod end receiving bore.

7. A coupling according to claim 5, wherein said recess extends parallel to the axis of said rod end receiving bore and is of uniform polygonal cross-section.

8. A coupling according to claim 5, wherein the end of the pin projecting radially outwardly from the body and remote from the rod engaging end is shaped to facilitate grasping said pin to effect rotation thereof about the pin axis to produce said camming action.

9. A coupling according to claim 5, wherein a clip retains the locking pin in position, said clip being U-shaped in profile and having first and second limbs, the first limb being located within the recess and the second limb being located on the outside of said body.

10. A coupling according to claim 9, wherein an upstanding projection on the second limb of said pin is located resiliently to engage a cooperating surface of the pin to retain said pin in a desired position of rotation.

11. A coupling according to claim 1, wherein the body adapted to receive the rod end comprises a bore with a stud-like projection extending radially inwardly from the bore wall, wherein the pin extends radially outwardly from the body through a bore in said stud-like projection, and wherein the camming action is provided by cooperating surfaces of the pin and the stud-like projection, rotation of said locking pin being effected about the longitudinal axis of said pin.

12. A coupling according to claim 5, wherein the rod-engaging end of the locking pin is profiled to ensure positive retention.

13. A coupling according to claim 11, wherein the rod-engaging end of the locking pin is profiled to ensure positive retention.

14. A coupling according to claim 5, wherein the rod-engaging end of the locking pin is substantially plane and wherein projections upstand from the bore surface at a location facing the recess whereby radially inward movement caused by camming of the locking pin causes said projections to bite into the rod end to provide positive retention.

15. A coupling according to claim 11, wherein the rod-engaging end of the locking pin is substantially plane and wherein projections upstand from the bore surface at a location facing the stud-like projection whereby radially inward movement caused by camming of the locking pin causes said projections to bite into the rod end to provide positive retention.

16. A coupling according to claim 1, wherein a gasket is interposed between the rod-like member and the body in which said rod-like member is received.

17. A coupling according to claim 1, wherein the rod-like member is of substantially circular section.

18. A coupling according to claim 1, wherein the rod-like member is of substantially rectangular section.

19. A pipe coupling comprising a length of hollow pipe and a housing having an axial bore dimensioned to receive one end of said hollow pipe, wherein a radial opening extends through the housing wall and a cam controlled locking pin projects radially outwardly through said opening and is longitudinally displaceable radially with respect to said pipe end, and wherein said cam control comprises a first camming surface on an inner wall part of said housing at the location of said radial opening and a second camming surface provided on an enlarged head portion at the radially inner end of the locking pin to cooperate with said first camming surface whereby rotation of said pin about its longitudinal axis through about 90° causes the cooperating camming surfaces to ride up one on the other and advance said pin about its longitudinal axis radially inwardly with respect to the pipe end to engage and lock said pipe end.

* * * * *